Nov. 11, 1969 R. V. HOWELL 3,477,786

CAMERA ALIGNING INSTRUMENT

Filed March 21, 1967 2 Sheets-Sheet 1

INVENTOR.
ROBERT V. HOWELL
BY
*Howard L. Johnson*
ATTORNEY

Nov. 11, 1969          R. V. HOWELL                3,477,786
                  CAMERA ALIGNING INSTRUMENT
Filed March 21, 1967                        2 Sheets-Sheet 2
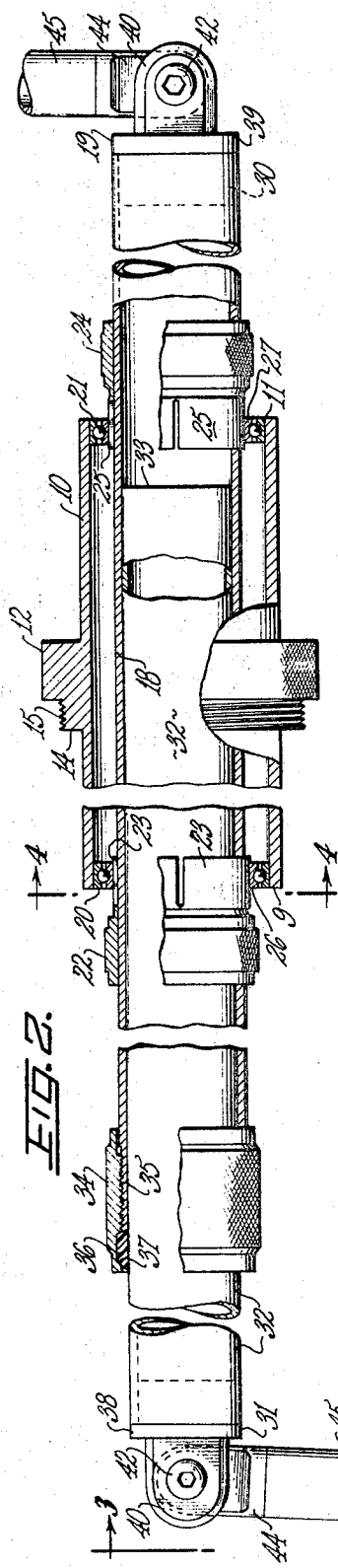
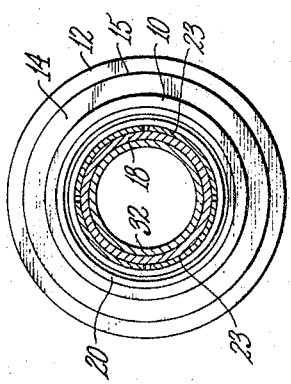
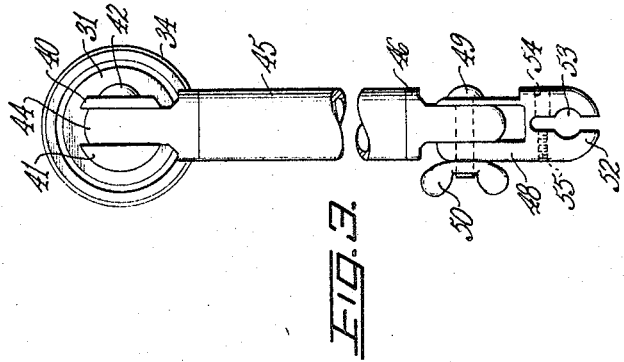
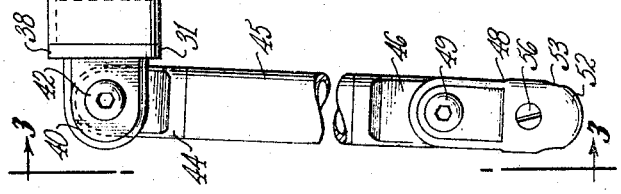
INVENTOR.
*ROBERT V. HOWELL*
BY
*Howard L. Johnson*
*ATTORNEY*

United States Patent Office 3,477,786
Patented Nov. 11, 1969

3,477,786
CAMERA ALIGNING INSTRUMENT
Robert V. Howell, 9820 S. Main St.,
Los Angeles, Calif. 90003
Filed Mar. 21, 1967, Ser. No. 624,806
Int. Cl. G03b 27/00, 27/52
U.S. Cl. 355—18                                                       10 Claims

ABSTRACT OF THE DISCLOSURE

In order to align mutually parallel, the copy holder, film holder and lens of a reproducing camera, the lens is removed and an attachment collar inserted in its place. The collar carries a rotatable and axially adjustable telescopic boom with a radius arm hinged at each end and a tactile plunger gage or a stylus held by each radius arm in position to contact the respective copy holder and film holder surfaces so as to describe concentric circles thereon upon rotation of the boom. The angular dispositions of the two radius arms can be varied for various diametric circles or arcs, but preferably they are oppositely oriented, i.e., in the same axial plane.

Background of the invention

This invention relates to a device for identifying small degrees of functional misalignment or variance of the planar surfaces respectively of the copy holder and of the film holder of an enlarging or reducing camera such as a process camera of a lithographic plant. Such surfaces should be disposed mutually parallel to the plane of the lens at the time of exposure of the film. Such precision is of critical importance, for instance, in printed circuit reproduction wherein miscrocircuitry may be enlarged, or reduced, say 128 times, in going to or from a copy wherein the circuit lines may be visible only by microscope. In such case, a rather minute misalignment of either surface may result in a hazy misprint area (usually toward the outer margin) which ruins the entire job due to inexact focussing of the light beam.

Such enlarging or reducing cameras are usually mounted on sturdy frames, with the copy holder, film holder and lens mount each disposed vertically for individual adjustment along their common horizontal axis. Great pains are taken to see that the three upright frames are parallel. Systems have been devised for aligning successive block areas of the copy holder surface absolutely perpendicular to the corresponding areas of the film holding surface. However all this mensuration may be frustrated simply by the unobserved and persistent tilting, on the order of a few seconds of arc, of the mounted lens. Accordingly the present aligning instrument is inserted in the lens holder itself, upon temporary removal of the lens, so that it aligns the film holder and copy holder to the actual path which will be followed by a beam of light passing through that particular lens in that precise mounting. Such aligning procedure can be repeated as often as desired and effected in a short period of time and with little inconvenience in comparison with previous methods.

Summary of the invention

In a brief, a threaded collar is seated securely in the lens mount after removal of the threadedly mounted lens therefrom; the collar carries an axial boom or shaft which is both freely rotatable and lengthwise adjustable therein so as to enable its opposite ends to be located adjacent the surfaces of the copy holder and of the film holder respectively; each end of the boom hingedly carries a radial arm bearing adjustable tactile means at its far end in position to contact the adjacent surface in a generally perpendicular disposition; desirably the two radial arms are angled in opposite directions (i.e., in the same transverse 180° plane relative to the axial boom) although not necessarily tilted at the same angle to the boom (i.e., they may describe circles of dissimilar diameter) and when the copy holder surface and the film holder surface are thus both contacted, the boom is (manually) rotated so that each radius arm in effect follows a concentric arc or circle on the respective surface. An adjustable linkage member at the far end of each radial arm holds a tactile element, which may be interchangeably, an indicator gage (such as used in truing a lathe), or a stylus or marking pen, so that the area and precise amount of misalignment relative to the true plane of the lens setting can be observed, and alternately the exact center of the focussed pattern of light can be determined from a thus-inscribed circle on each surface; and corresponding points on the two surfaces can also be identified. Restated: it is assumed that the film holder and lens holder are planar surfaces—this is checked by other means. The present instrument aligns these surfaces (or one of them) with the actual plane of the lens. The device also provides auxiliary collars to fit different diameter lens mounts so that the instrument can be transferred from one location or camera to another, and be used interchangeably to align cameras of different dimension lens mounts.

Accordingly it is among the objects of the invention to achieve the foregoing and related results as will become more apparent from the following specification which illustrates by way of example a presently preferred embodiment wherein:

FIGURE 1 is a side elevational view of my device shown in operative position mounted in the lens socket of a camera (of which the bellows are indicated in phantom) with its pair of radius arms each carrying an indicator gage in tactile registration respectively with the film holder and copy holder surfaces, each of which surfaces appears in vertical section, with the half-turn or 180° position of the pair of radius arms also shown in phantom;

FIGURE 2 is an enlarged lateral elevational view of the device without the contact elements, partially in axial section and with portions broken away;

FIGURE 3 is an end view of the same taken along the line 3—3 of FIGURE 2;

FIGURE 4 is a transverse sectional view taken along the line 4—4 of FIGURE 2;

Figure 1:
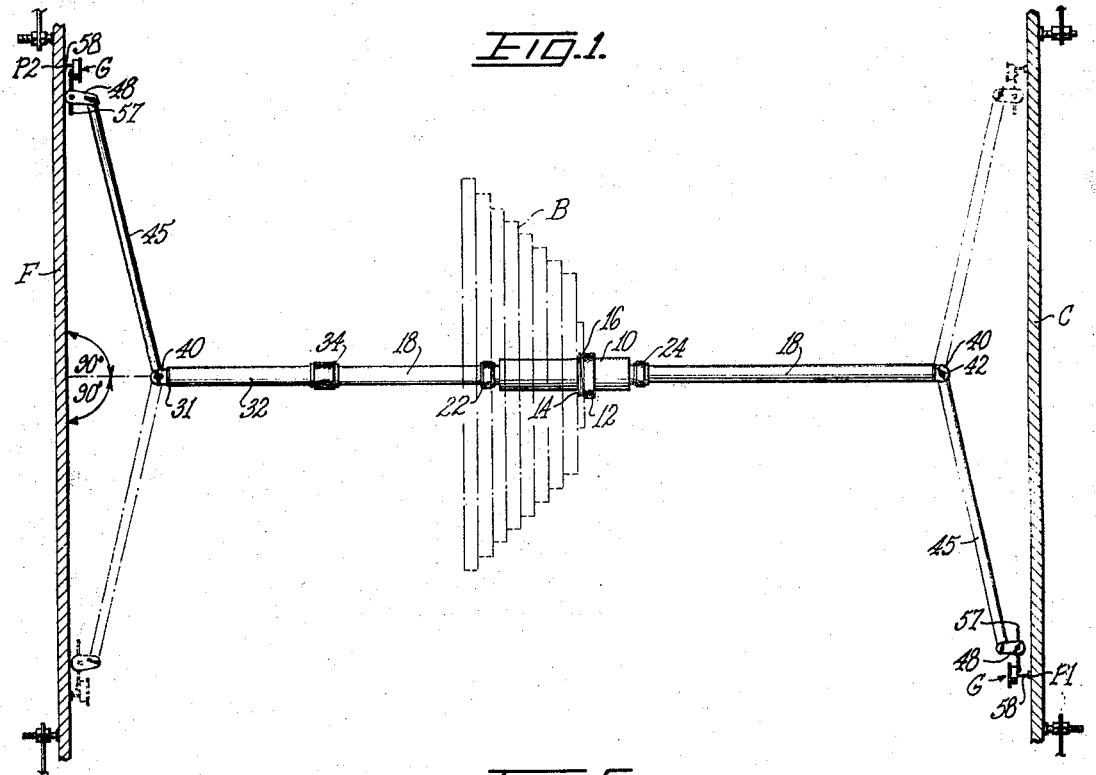

As seen particularly in FIGURE 2, there is provided an elongated collar or attachment member 10, formed with a peripherally projecting boss 12 located intermediate its ends and externally knurled for manual grasping in mounting and demounting. An adjacent, annular stepped portion 14 is provided with external threads 15 adapted to engage a correspondingly threaded socket 16 of a camera from which the lens (not shown) has been temporarily removed. Thus, when it is desired to align the filmholder F and copyholder C with the mounted lens, the latter is removed and replaced with the sleeve 10.

A cylindrical tubular boom or shaft 18 traverses the length of the collar 10 and extends outwardly axially from each end thereof, being rotatably mounted by means of ball bearing raceways 20, 21 which are located within the respective ends 9, 11 of the collar. Spaced outward from the end of each collar end, each projecting portion of the shaft 18 carries a peripherally knurled, axially slidable, band or ring 22, 24, each fixedly projecting toward the collar 10 a tapered, axially slit annulus 23, 25 which may be lengthwise wedged or inserted partway between the external periphery of the shaft 18 and the inner ring 26, 27 of the respective ball-bearing raceway so as to anchor the collar 10 against lengthwise displacement along the shaft 18 while leaving the latter freely rotatable within the mounted collar. When both tapered rings 23, 25 are loose, the collar 10 can slide along the entire length of the shaft 18 and accordingly be fixed at any selected position therealong by sliding toward each other the two rings 22, 24 so as to engage its opposite ends. The operator can thus adjust the instrument to the location of a lens mount (16) which is fairly close to one surface (F or C) and fairly distant from the other. In any event, it enables the collar 10 to be moved to one end of the shaft 18 for first mounting the former in the lens socket 16, and then equalizing the length of the shaft within the socket-mounted collar thereafter. It will be apparent also that in some instances (particularly with an inverting or mirror camera) the two surfaces F and C are not coaxial, and just one of the surfaces may be thus aligned with the plane of the lens.

One end of the tubular shaft 18 has a fixed plug insert 30, and the other end receives a longitudinally slidable tube 32 having its inner end indicated at 33, which tube in effect thus makes the shaft telescopic in length. An internally threaded locking collar 34, removably engages a threaded end 35 of the shaft 18, with its overlying outer end forming an annular cage for a free-riding, edge-tapered spilt ring 36, When the collar 34 is screwed up tight, the split ring is thus compressed annularly jointly between the threaded end 35 and the terminal lip or edge 37 of the collar 34 so as to bind the encircled tube 32 whereby the latter is secured against subsequent lengthwise displacement as well as independent rotary movement. The split ring 36 as well as the tapered annuli 23, 25 are conveniently formed of synthetic organic plastic or the like, which thus does not mar the metal surfaces over which it slides or abuts against.

The opposite shaft end 19, and the outer end of the tube 32 each carry a disk-shaped cap 38, 39 projecting a parallel pair of axially directed, transversely apertured, bearing ears 40, 41, of which the latter one is internally threaded to receive the end of a headed screw 42. The transverse screw serves as a hingepin and traverses a terminal tongue 44 of a radius arm 45 so as to fix the arm at any chosen angle relative to the shaft 18. Each radius arm also has its outer end formed with a similar, transversely apertured, axial tongue 46 which is coupled to an adjustable linkage member 48 (FIG. 3) by means of a headed bolt 49 and wing nut 50.

Each linkage member 48 has an axially split end 52 formed with a transverse cylindrical channel 53 and a perpendicular bore 54, one end of which 55 is internally threaded to receive a set screw 56 which thus clamps together the split ends to retain a removable tactile or contact element. As here illustrated, the attachment stem 57 of a dial-type indicator gage G is held securely in the channel 53, with its retractable contact probe or plunger 58 disposed in sliding registration with and generally perpendicular to the adjacent planar surface F or C. By moving such a gage in an arcuate path near the edge of the surface, it indicates the misalignment or tilt of the contacted surface relative to the plane of the lens (as determined by the actual disposition of the lens socket 16 which now holds the attachment collar 10). Various types of lever-actuated flatness gages can be used, as well as those which electronically measure the displacement. In place of the displacement gage G, the channel 53 occasionally carries a stylus or inking pen (not shown) which sweeps a circle on the surface F or C, so that by then locating the center of the circle thus inscribed, the focal point of the lens on this particular surface can be identified.

The linkage member 48 and the radial arm 45 thus jointly constitute adjustable coupling means for connecting the rotatable shaft 18 with the tactile element G. When the two radius arms 45, 45a lie oppositely directed in the same axial plane (as seen in FIG. 1) a straight line drawn between the two contacted points P1, P2— if it passes through the lens—will represent the path of travel of a beam of light between the copy C and the film F so that if the lens mounts 16 were holding the removed lens instead of the present instrument, these two points P1, P2 would be the ones actually contacted by a beam of light in the functioning camera.

In any event, it will be apparent that the arc described by a swinging contact probe 58 is generally coaxial to the longitudinal axis of a beam or path of light which axially traverses the lens or lens mount of the camera.

Figure 5:
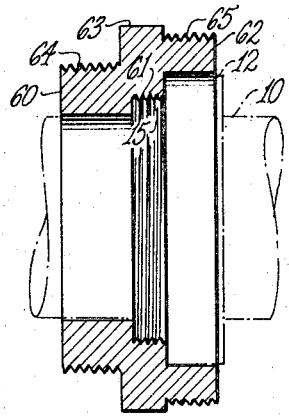
FIGURE 5 shows an auxiliary collar, seen in axial section, mounted on the lens-socket-engaging collar of the apparatus, which is indicated in phantom.

For greater versatility, the device may also be provided with auxiliary attachment means for mounting different size lens mounts (16), that is, in different cameras. As seen in FIG. 5, an auxiliary collar 60 is formed with threads 61 of a size to engage the attachment threads 15 of the collar 10, and with a forward extending annular or stepped portion 62 which loosely overlies the boss 12 of the sleeve. A generally central, hand-engageable boss 63 is formed to locate itself adjacent the lens mount 16 when either the smaller band of threads 64 or the larger band 65 is engaged in the particular lens mount. If desired, such a series of threaded coupling joints (64, 65) can be formed integral with the sleeve 10 in place of being on a detachable collar (60).

It will be clear to those skilled in the art that various changes of construction and operation may be made within the present inventive concept and therefore this disclosure is not to be limited to the precise details described and illustrated by way of example, but it is my intention to claim the invention broadly as hereinafter defined aside from the limitations inherent in the prior art.

I claim:
1. A camera aligning device of the character described, comprising in combination:
 an attachment member adapted for attachment coaxial with the lens mount of a camera and adapted in such position to extend in the direction of the path of light through said lens mount towards at least one of the surfaces of a copy holder or film holder which is required to be aligned parallel with the plane of a lens in said lens mount;
 tactile means carried by said attachment member and adjustably disposable in moving contact with one of said surfaces generally coaxial to said path of light; and
 means for moving said tactile means arcuately over said contacted surface, thereby to indicate possible deviation from precise alignment of said surface with the plane of the camera lens.

2. The device of the preceding claim 1 wherein said tactile means comprises retractable plunger-activated gage means.

3. The device of the preceding claim 1 wherein said tactile means comprise stylus means.

4. The device of the preceding claim 1 wherein said attachment member extends in both directions from said lens mount, thereby to dispose said tactile means in contact with both of said surfaces simultaneously.

5. A camera aligning device of the character described, comprising in combination:
 an attachment member having means for temporary installation in the lens mount of a camera and the like in place of the lens;
 a shaft carried by said attachment member and thus disposable perpendicular to said lens mount and extending axially outward therefrom in both directions, respectively toward a copy holder surface and toward a film holder surface of said camera, which surfaces may be axially adjustable relative to the lens and are required to be disposed mutually parallel to each other and to the plane of said lens at all such adjustment positions;
 tactile means disposable in registration with the respective copy holder and film holder surfaces, and adapted to indicate deviation of either contacted surface from precise, parallel relation, to the plane of the lens mount;

intermediate coupling means connecting the respective ends of said shaft with said tactile means and adapted to dispose the same at selected radial positions adapted upon rotation to describe arcuate paths of selected diameters on the adjacent copy holder or film holder surfaces which are contacted thereby, and means to rotate said contacting tactile means relative to said attachment member, thereby to indicate possible misalignment of any contacted area and also the location of any point on either of said surfaces corresponding to a point on the other surface between which a beam of light would travel in traversing the mounted lens.

6. The device of the preceding claim 5 wherein said intermediate coupling means comprises a radius arm hingedly disposed at each end of said shaft and said shaft is rotatable relative to said attachment member.

7. The device of the preceding claim 5 wherein said shaft is formed with telescopic sections and is provided with means for locking same at selected positions of axial extension.

8. The device of the preceding claim 5 which is provided with a plurality of attachment means for mounting said attachment member in lens mounts of different diameter.

9. The device of the preceding claim 5 wherein said shaft is movable lengthwise through said attachment member and is provided with locking means comprising at least one annular wedge-shaped ring adapted for partial insertion between said shaft and an adjacent end of said attachment member for restraining the same against lengthwise displacement while permitting rotation thereof within said attachment member.

10. The device of the preceding claim 6 wherein said shaft is movable lengthwise through said attachment member and is formed with telescopic sections, being furnished with means for locking same at selected positions of axial extension and for restraining said shaft against lengthwise displacement along said attachment member while permitting rotation thereof within said member.

References Cited

UNITED STATES PATENTS 2,609,737    9/1952    Markle _____ 95—11

NORTON ANSHER, Primary Examiner

RICHARD A. WINTERCORN, Assistant Examiner

U.S. Cl. X.R.

33—64; 95—1, 11; 355—61; 356—127